(12) United States Patent
Hanselmann et al.

(10) Patent No.: US 11,322,986 B2
(45) Date of Patent: May 3, 2022

(54) INDUCTIVE POWER TRANSMISSION WITH RESONANT CIRCUIT AND METHOD FOR OPERATING THE DEVICE

(71) Applicant: BRUSA Elektronik AG, Sennwald (CH)

(72) Inventors: Marc Hanselmann, Frümsen (CH); Lukas Böhler, Wangs (CH); Richard Knuchel, Altstätten (CH)

(73) Assignee: BRUSA Elektronik AG, Sennwald (CH)

( * ) Notice: Subject to any disclaimer, the term of this patent is extended or adjusted under 35 U.S.C. 154(b) by 0 days.

(21) Appl. No.: 17/252,109

(22) PCT Filed: Jun. 24, 2019

(86) PCT No.: PCT/EP2019/066650
§ 371 (c)(1),
(2) Date: Dec. 14, 2020

(87) PCT Pub. No.: WO2020/002218
PCT Pub. Date: Jan. 2, 2020

(65) Prior Publication Data
US 2021/0257860 A1 Aug. 19, 2021

(30) Foreign Application Priority Data
Jun. 29, 2018 (DE) .................. 10 2018 115 855.6

(51) Int. Cl.
*H02J 50/12* (2016.01)
*B60L 53/122* (2019.01)
*H04B 5/00* (2006.01)

(52) U.S. Cl.
CPC ............ *H02J 50/12* (2016.02); *B60L 53/122* (2019.02); *H04B 5/0037* (2013.01); *H04B 5/0075* (2013.01)

(58) Field of Classification Search
CPC ..... H02J 50/12; H04B 5/0075; H04B 5/0037; B60L 53/122
See application file for complete search history.

(56) References Cited

U.S. PATENT DOCUMENTS 5,859,873 A 6/1999 Ritter
10,277,061 B1 * 4/2019 Kerselaers ............... H02J 50/80
(Continued)

FOREIGN PATENT DOCUMENTS

DE 10 2015 221 065 A1 5/2017
EP 2346142 A1 7/2011
(Continued)

*Primary Examiner* — Daniel Cavallari
*Assistant Examiner* — Brian K Baxter
(74) *Attorney, Agent, or Firm* — Hoffmann & Baron, LLP (57) ABSTRACT

The invention relates to an inductive power transmission with a resonant circuit, the resonant circuit including a transmitting/receiving coil or a transmitting and receiving coil for transmitting and/or receiving electromagnetic energy, a coupling capacitor, a tuning capacitor, and a switching device, wherein the switching device is connected in series to the coupling capacitor and the tuning capacitor, and wherein, furthermore, the switching device is designed to activate and/or disconnect a signal generator and to modify a quality factor or to modify the resonance frequency of the resonant circuit.

12 Claims, 2 Drawing Sheets

(56) References Cited

U.S. PATENT DOCUMENTS

| | | | | |
|---|---|---|---|---|
| 10,403,113 | B1* | 9/2019 | Antar | B60L 3/00 |
| 2006/0186995 | A1* | 8/2006 | Wu | H04B 1/408 |
| | | | | 340/10.1 |
| 2007/0109819 | A1* | 5/2007 | Powell | H03C 3/145 |
| | | | | 363/21.02 |
| 2008/0012654 | A1* | 1/2008 | Han | H03J 7/045 |
| | | | | 331/167 |
| 2008/0088415 | A1* | 4/2008 | Quan | G06K 7/0008 |
| | | | | 340/10.3 |
| 2008/0129215 | A1* | 6/2008 | Boys | H02J 50/40 |
| | | | | 315/209 R |
| 2015/0229164 | A1 | 8/2015 | Fukaya | |
| 2015/0341087 | A1* | 11/2015 | Moore | H02J 50/50 |
| | | | | 455/77 |
| 2017/0185173 | A1* | 6/2017 | Ito | G06F 3/03545 |
| 2017/0237292 | A1 | 8/2017 | Jeong et al. | |
| 2018/0034506 | A1* | 2/2018 | Moore | H02J 50/80 |
| 2020/0161901 | A1* | 5/2020 | Tombelli | B60L 53/30 |

FOREIGN PATENT DOCUMENTS

| | | |
|---|---|---|
| EP | 3334009 A1 | 6/2018 |
| JP | 2008-089498 A | 4/2008 |

\* cited by examiner

INDUCTIVE POWER TRANSMISSION WITH RESONANT CIRCUIT AND METHOD FOR OPERATING THE DEVICE

CROSS-REFERENCE TO RELATED APPLICATIONS

The present application is the U.S. National Phase of PCT/EP2019/066650, filed on Jun. 24, 2019, which claims priority to German Patent Application No. 10 2018 115 855.6, filed on Jun. 29, 2018, the entire contents of which are incorporated herein by reference.

BACKGROUND

Field

The invention relates to the technical field of inductive charging. In particular, the present invention relates to a resonant circuit device and to a method for operating a resonant circuit device.

Related Art

A system for inductive energy transmission can be used to electrically charge a purely electric vehicle (EV, electric vehicle) or a hybrid vehicle (PHEV, plug-in hybrid-electric vehicle) that is operated with a combination of fuel and electrical energy, if charging should be done in a contactless manner. In such a system, an alternating magnetic field is generated in the frequency range of 25 kHz-150 kHz. It must be noted that outside this frequency band, the limit values for the emission of electromagnetic waves are specified by internationally applicable standards. Although a magnetic field is used in principle for energy transmission, it is inherently an electromagnetic wave due to the fact that the magnetic field changes. Because of the slow changes in the field strengths, the electromagnetic wave used in inductive charging has a wavelength of a plurality of kilometers.

In order to comply with these limit values for emissions, it must be ensured that the alternating magnetic field used for energy transmission works with a fundamental resonance in the range of 25 kHz-150 kHz and contains only very low harmonics. Therefore, filters are used that remove disruptive harmonics as much as possible. In addition, in order to comply with the internationally applicable standards and guidelines, it must be ensured that an energy transmission only takes place when a specific quality of the coupling to one another is achieved by adjusting a specific alignment of the coupling elements to one another, for example, by a positioning system such as described in the document EP 3 103 674 A1.

A GPM (ground pad module) with a primary coil is used as a coupling element for the energy transmission on the stationary side and a CPM (car pad module) with a secondary coil on the vehicle side. GPM and CPM form a transformer for coupling and energy transmission. The physical alignment of the coupling elements to one another is measured and adjusted via a positioning signal, for example, WLAN (wireless local area network).

Different transmission links and different transmission technologies are used for the energy transmission and the transmission of the positioning signal.

SUMMARY

It may be seen as an object of the present invention to allow for an effective transmission of energy and of a positioning signal.

Accordingly, a resonant circuit device, a vehicle, and a method of operating a resonant circuit device are specified.

The subject matter of the invention is indicated by the features of the independent claims. Embodiments and further aspects of the invention are given from the dependent claims and the following description.

According to one aspect of the invention, a resonant circuit device is provided. The resonant circuit device has a transmitting/receiving coil or a transmitting and receiving coil for transmitting and/or receiving magnetic energy, a coupling capacitor, a tuning capacitor, and a switching device. In this resonant circuit device, the switching device is connected in series with the coupling capacitor and the tuning capacitor. In addition, the switching device is designed to activate and/or disconnect a signal generator and to detune a quality factor of the resonant circuit device.

According to a further aspect of the present invention, a transformer is specified, including a primary coil and the resonant circuit device having the transmitting/receiving coil. The transmitting/receiving coil is magnetically coupled to the primary coil as a secondary coil.

According to yet another aspect of the present invention, a vehicle is described having the resonant circuit device and/or the transformer.

According to another aspect of the present invention, a method of operating the resonant circuit device is specified. The method includes ensuring that the signal generator is activated by means of the switching device and operating the signal generator.

The transmitting/receiving coil is designed for the bidirectional transmission of magnetic energy. This magnetic energy may be transmitted with an electromagnetic wave having a very long wavelength of, for example, a plurality of kilometers. Tuning an energy transmission resonant circuit in a positioning resonant circuit can be achieved by means of the switching device. In other words, this means that by detuning an energy transmission resonant circuit, it can be achieved that this energy transmission resonant circuit can be used as a positioning resonant circuit.

While the energy is transmitted with a substantially constant amplitude, the positioning signal may be transmitted as an amplitude-modulated signal, in which the information about the positioning is encoded in the amplitude. A magnetic field may be used both in the energy transmission and in the transmission of the positioning signal. However, the wavelength of the electromagnetic wave that results for the positioning signal may be shorter than the wavelength of the electromagnetic signal that results for the energy transmission. Accordingly, the positioning signal may be in a different frequency band than the energy transmission signal. Due to the different frequency bands, the two signals can also excite different resonances. In addition to the positioning signal, which can use a keyless protocol, for example, a further electromagnetic signal can be used which is in a different frequency band, such as a WLAN signal.

The energy transmission and the transmission of the positioning signal may take place at different times. The transmission channel for the magnetic field or the resulting electromagnetic wave can thus be used exclusively for the energy transmission or the transmission of positioning signals. The direction of the energy transmission and the transmission of the positioning signal may be opposite.

Since the information of the positioning signal is encoded in the amplitude of the magnetic field, it may be desirable for decoding the signal to recover the original signal. It may therefore be desirable that preceding signal components do not interfere with subsequent signal components. Such interference can be prevented if signals that have already been sent are dampened so that they do not interfere with other signals. In the case of excessive resonance at resonance frequencies, signals could build up and interfere with one another. It may therefore be desirable for signal transmission to dampen emitted signals. Since a high level of damping can be achieved by means of a detuned resonant circuit, it may be desirable to detune the resonant circuit during signal transmission or to reduce the quality Q of the resonant circuit during signal transmission. In contrast, a high quality may be desirable for energy transmission. As an alternative to using amplitude modulation, the positioning signal can also use phase modulation to transmit information.

By checking that the signal generator for the positioning signal is not operated until it is ensured that the signal generator is activated by means of the switching device, the exclusivity of the magnetic channel or the magnetic transmission link can be ensured.

According to a further aspect of the present invention, the switching device has a resistor which is designed to detune the quality factor of the resonant circuit device.

In one example, the quality factor or the quality Q of the resonant circuit device may be adjustable in such a way that, when the signal generator is activated, it is in the range from 8 to 16 or in the range of [8-16]. In the case of energy transmission, when the signal generator is decoupled, a higher quality is adjusted, for example a quality Q that is greater than 100. The required quality may depend on the signal frequency and also on the signal structure, i.e., whether an amplitude-modulated signal or a phase-modulated signal is used.

According to another aspect of the present invention, the switching device has galvanic separation.

In one example, this galvanic separation may be arranged between the switching device and the signal generator. The switching device thus has a galvanic separation from the signal generator. The galvanic separation can ensure that no energy from the resonant circuit reaches the signal generator and destroys it.

According to another aspect of the present invention, the switching device further includes a control unit, the control unit being designed to ensure that the signal generator is only operated when the signal generator is activated and/or that no further energy is transmitted. The control unit may be operated by means of a program element and be connected to the switching device. The control unit can also have sensors in order to recognize an adjusted state. By means of the switching device, the control unit can switch back and forth between at least two operating states.

By ensuring that either energy or the signal generated by the signal generator, for example the positioning signal, is transmitted, specifications from international standards or guidelines can be met. The control unit can also be designed in such a way that it detects a sufficient coupling of the transmitting/receiving coil to a primary coil, and only when this sufficient coupling is ensured is it designed to begin with the energy transmission. Sufficient coupling may be recognizable by measuring a magnetic coupling factor k. Such test behavior may also be specified by an international guideline.

According to yet another aspect of the present invention, a bridge rectifier is connected in parallel to the series connection of the tuning capacitor and the switching device.

The bridge rectifier or bridge circuit can ensure that the energy transmitted during the energy transmission is passed on to an HVDC (high voltage direct current) circuit or an intermediate circuit. In one example, the voltage of the HVDC circuit is selected in such a way that it is generated during the positioning signal, is applied to the bridge rectifier and is greater than the positioning signal that is generated. The HVDC voltage is defined by the HV (high voltage) battery or the traction battery of the vehicle. The HVDC voltage is, for example, in a range between 170 V-440V. The voltage is substantially not changeable by the inductive charging system, but rather is defined by the state of charge of the battery. In other words, the HV battery used has an influence on the dimensioning of the resonant circuit device. However, since the HVDC voltage is usually much higher than the voltage used for the positioning signal, the condition can be met that the HVDC voltage applied to the bridge rectifier while the positioning signal is generated is greater than the positioning signal generated. Fluctuations in the HV battery voltage are also in a range that is substantially unimportant for the positioning signal.

By selecting a voltage at the output of the bridge circuit that is greater than the voltage of the positioning signal generated, it is possible to prevent energy from flowing through the bridge rectifier into a battery connected to the output of the HVDC switching circuit. The control unit can ensure that the HVDC voltage is present while the positioning signal is being generated.

According to another aspect of the present invention, the capacitance of the tuning capacitor is dimensioned such that the resonant circuit device has a predeterminable resonance frequency, in particular, when the switching device is open. This resonance frequency may correspond, for example, to the transmission frequency of a positioning signal.

In one example, the frequency of the positioning signal is specified by the keyless entry technology, for example by KEYLESS GO™, and is 125 kHz or 135 kHz. The positioning signal can substantially have three signal segments and, in particular, time segments. For example, the positioning signal can have a 125 kHz sinusoidal time segment through which the signal receiver can determine the distance to the signal transmitter. Furthermore, the positioning signal can have a wake-up time segment, within which a wake-up signal pattern is transmitted, which puts a receiver into a receive mode, for example to initiate the distance measurement. In addition, the positioning signal can have a burst that can be 10 ms long, for example.

According to another aspect of the present invention, the resonant circuit device is designed as a car pad module (CPM) and/or as a ground pad module (GPM). For example, the components of the resonant circuit device are housed in a plastics material housing which can be attached to the underside of a vehicle. This plastics material housing can have a standardized size.

According to yet another aspect of the present invention, a computer-readable storage medium is provided on which a program code is stored which, when it is executed by a processor, carries out the method for operating the resonant circuit device. The control unit can use such a processor.

A floppy disk, a hard disk, a USB (Universal Serial Bus) storage device, a RAM (Random Access Memory), a ROM (Read Only Memory), or an EPROM (Erasable Programmable Read Only Memory) may be used as a computer-readable storage medium. An ASIC (application-specific integrated circuit) or an FPGA (field-programmable gate array), as well as an SSD (Solid-State Drive) technology or a flash-based storage medium, can also be used as storage media. A web server or a cloud can also be used as a storage medium. A communication network, such as the Internet, for example, which may allow program code to be downloaded, may also be viewed as a computer-readable storage medium. A radio-based network technology and/or a wired network technology can be used.

According to yet another aspect of the present invention, a program element is created which, when executed by a processor, executes the method for operating the resonant circuit device.

BRIEF DESCRIPTION OF THE DRAWINGS

In the following, further embodiments of the present invention are described with reference to the drawings.

DETAILED DESCRIPTION

The representations in the drawings are schematic and not to scale. In the following description of FIGS. 1 to 4, the same reference signs are used for the same or corresponding elements.

In this text, the terms "capacitor" and "capacitance" as well as "coil" or "choke" and "inductance" should be used synonymously and should not be interpreted restrictively unless otherwise specified.

Figure 1:
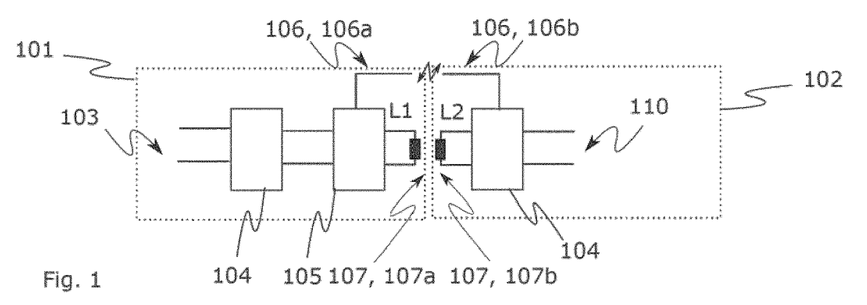
FIG. 1 shows a transmission link for inductive charging for a better understanding of the present invention.

FIG. 1 shows a transmission link for inductive charging for a better understanding of the present invention. The transmission link substantially has the stationary ground pad module (GPM) 101 coupled via an air interface and the mobile car pad module (CPM) 102. The main supply is supplied in the form of a voltage via the connection 103. An AC mains voltage with 50 Hz or 60 Hz can be used as the main supply (mains). However, it is also possible to use a DC voltage from a central DC source as mains and only operate the converters locally at 85 kHz for inductive energy transmission.

The main supply is converted into an alternating voltage via the inverter 104 to achieve 85 kHz for inductive transmission. A ground transmitting/receiving device 105, which can have a ground control unit, a separation of the energy transmission 107 and the signal transmission 106 takes place. The signal transmission serves to transmit a positioning signal and takes place via the positioning signal channel 106, 106a. The frequency for the transmission of the positioning signal can be 125 kHz or 135 kHz, or any value in the range of [125 kHz; 135 kHz]. The ground transmitting/receiving device 105 can be a control unit and/or various components for separating and/or combining the signals on the channels 106, 107. The separation into different channels of the energy transmission 107 and of the positioning signal 106 in FIG. 1 is intended to make it clear that these are logically separate functional units. However, in order to save costs and material, it can make sense to use as many components as possible together. Thus, at least on the secondary side 102, the receiving coil L2 can be used both for receiving the energy during a charging process and as a transmitting coil for a positioning signal. However, it may be possible to make adjustments for this shared use of the infrastructure. It should be taken into account that a receiving infrastructure for the positioning signal is designed for a different resonance frequency at around 125 kHz than the infrastructure for energy transmission, at around 85 kHz. Use can also be made of the fact that charging and positioning do not take place at the same time and the signals therefore do not overlap. The receiving infrastructure for determining the position in space, expressed by x, y, z coordinates, may differ from the charging infrastructure. However, the primary coil L1 can also receive the positioning signal while the energy transmission is switched off and the positioning is being carried out. This positioning signal received in the primary coil L1 can be used for a distance measurement of the GPM 101 from the CPM 102 and/or measurement of the coupling factor k between the GPM 101 and the CPM 102 using the components that are already available for the energy transmission, for example, a current and/or a voltage measuring device for the coil L1.

The energy transmission, which is substantially derived from the energy source connected to the connection 103, takes place via the energy transmission channel 107, 107a. The energy provided in the form of an alternating voltage is converted into a magnetic field via a primary coil L1 or a ground transmitting/receiving coil. The frequency of the magnetic field for energy transmission can be selected, for example, from a range of [25 kHz; 150 kHz]. This frequency range may be specified by international standards or guidelines. As a result, the energy transmission signal and the positioning signal are in different frequency bands. By switching the positioning signal on and off over time, a separation of the signals over time can be achieved, so that the two signals can be prevented from interfering with one another.

The magnetic field generated by the alternating voltage (AC) penetrates the secondary coil L2 of the CPM 102. The time-variable magnetic field has a very long wavelength and is converted back into an alternating voltage in the secondary coil L2 or the vehicle transmitting/receiving coil L2, which is fed to the vehicle transmitting/receiving unit 104. A positioning signal can be transmitted via the positioning signal channel 106, 106b. The transmission of the positioning signal also takes place wirelessly via the positioning signal channel 106. For example, the transmission of the positioning signal can use keyless entry technology and in particular the frame structure specified by the keyless protocol or the keyless go protocol. The positioning signal may substantially allow a receiver to determine the distance thereof from a transmitter. While the positioning signal is being emitted, a WLAN signal using WLAN technology may also be sent. The WLAN signal may be activated before the positioning signal is activated and only switched off after the positioning signal has been switched off. Hence, both signals, WLAN signal and positioning signal, may be present at the same time. This coexistence of the WLAN signal and the positioning signal may be possible because both signals use different frequency bands. The WLAN signal may be used for bidirectional communication between the transmitter 102 and the receiver 101, while the positioning signal is sent unidirectionally from the transmitter to the receiver, for example, from a CPM to a GPM.

In contrast to the energy transmission via the energy transmission channel 107, which takes place as a substantially pure magnetic field, the positioning signal in the positioning signal channel 106 can take place either as a pure magnetic field and/or as an electromagnetic field. The two channels 106, 107 or transmission links 106, 107 can be separate channels 106, 107.

However, in order to save costs and/or weight, for example, the energy transmission channel 107 and the positioning signal channel can also be combined, so that the energy transmission and the signal transmission take place via the same channel. In this context, the use of the same channel may describe a situation in which the energy transmission takes place via the same components as the signal transmission, substantially via the same transmitting/receiving unit L1, L2. In particular, a communication channel can be designed via the energy transmission channel 107 during the energy transmission, which allows fast feedback from the CPM to the GPM, for example if a crowbar or clamping switch device is actuated due to a load shedding and the GPM has to be switched off quickly.

Figure 2:
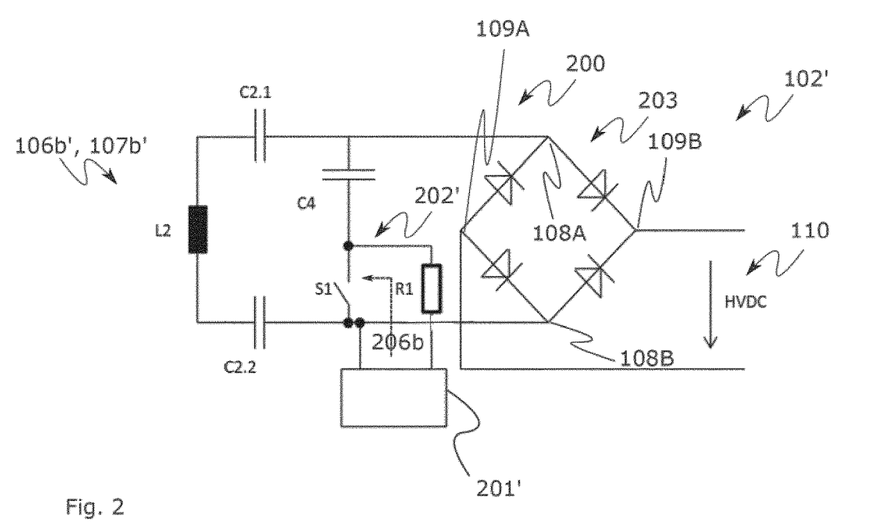
FIG. 2 shows a resonant circuit device of a CPM according to one embodiment of the present invention.
Figure 3:
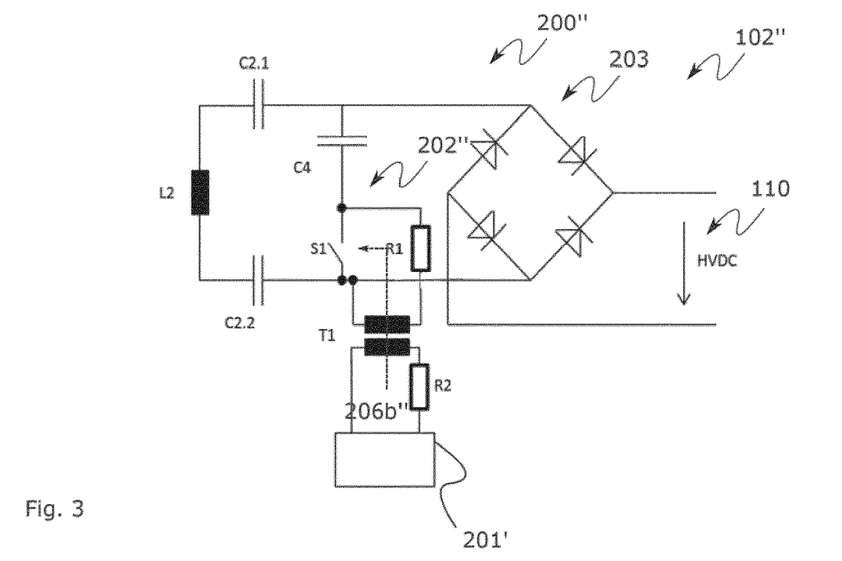
FIG. 3 shows a resonant circuit device of a CPM with a galvanically separated coupling circuit according to one embodiment of the present invention.

FIG. 2 shows a resonant circuit device 200 of a CPM 102' according to one embodiment of the present invention. The resonant circuit device 200 has the transmitting/receiving coil L2 for transmitting and/or receiving magnetic energy. This transmitting/receiving coil L2 or the transmitting/receiving unit L2 can be used both for signal transmission as a signal transmission channel 106b' and for energy transmission as an energy transmission channel 107b'. The positioning signal which is emitted by the secondary coil L2 is measured in the GPM by the main coil L1 or the primary coil L1 in order to determine the coupling and, in particular, the coupling factor k between the primary coil L1 and the secondary coil L2. The distance between the transmitter L2 and the receiver L1 is thus indirectly determined by means of the positioning signal. For a more precise determination of the positioning, further sensor coils (not shown in FIG. 1) can be provided in the GPM 101, which in addition to the primary coil L1 also receive and evaluate the positioning signal. For example, in the region of the primary coil L1, additional six sensor coils can be arranged in different orientations to one another in order to be able to determine an exact position of the GPM 101 relative to the CPM 102. These six sensor coils can be understood as the positioning channel 106, 106a, 106b. In addition, the measurement of the voltage induced in the opposite main coil can also be used to determine the coordinates or the distance. The coupling of the positioning signal into the coil L2 described in FIGS. 2 and 3 is only implemented on the secondary side. However, it would also be conceivable to also send such a positioning signal from the GPM 101 via the GPM main coil L1.

The resonant circuit device 200 has the coupling capacitor C2.1, C2.2. This is designed in FIG. 2 as two capacitors, namely an upper coupling capacitor C2.1 and a lower coupling capacitor C2.2. However, it is sufficient if a single one of the two capacitors is provided, for example, C2.1. The design of the coupling capacitor as two capacitors is a design variant that offers good insulation strength. At this point it does not necessarily have to meet the criteria of galvanic separation. The capacitances used do not have to be designed as insulation. A tuning capacitor C4 and a switching device S1 or a switch S1 are connected in series with the coupling capacitor C2.1, C2.2. The switching device S1 is provided to activate and/or disconnect a signal generator 201' and thus indirectly also to activate and disconnect the positioning signal.

By activating and/or disconnecting the signal generator 201', a signal generated by the signal generator 201' can be coupled into the resonant circuit L2, C2.1, C2.2, C4. The signal generator 201' is connected in series to the resistor R1 and connected in parallel to the switch S1. The arrangement of the capacitor C4 in series with the parallel connection of the switching device S1 and the coupling circuit 202' ensures that C4 has an influence on the resonance frequency of the resonant circuit formed in both switching states of the switch S1. The resonance frequency can be varied by means of the switching device S1 without having to switch a coil. It may be cheaper to use switchable capacitors instead of switchable coils to adjust the resonance frequency.

If the switch S1 is opened, the resistor R1 and the signal generator 201' are connected in series to the tuning capacitor C4. In this open position of the switch, the resonant circuit of the resonant circuit device 200, which is now formed from L2, C2.1, C2.2, C4 and R1, is detuned. When detuning, the quality factor Q of the resonant circuit device 200 is changed in relation to the resonant circuit in the closed position of the switch.

In the closed position of the switch, the signal generator 201' and the resistor R1 are short-circuited and the resonant circuit of the resonant circuit device is formed from L2, C2.1, C2.2 and C4.

In other words, by opening the switch S1, a detuning of an energy transmission resonant circuit into a positioning resonant circuit takes place. Thus, by opening the switch S1, an energy transmission resonant circuit is converted into a positioning resonant circuit, the two resonant circuits having different resonance properties. An energy transmission resonant circuit is a resonant circuit whose resonance frequency is adjusted to the resonance frequency suitable for energy transmission. A positioning resonant circuit is a resonant circuit whose resonance frequency is adjusted to the resonance frequency suitable for signal transmission, the signal being a positioning signal.

Switching over the switch S1 may allow a positioning signal or positioning signal to be coupled into an energy transmission circuit. For coupling, the resonance frequency detuning and the damping of the secondary resonant circuit L2, C2.1, C2.2. C4 are used. The damping takes place by inserting the resistor R1 into the resonant circuit device 200. The damping and/or the resonance detuning serve to improve the signal quality and increase the reception quality. However, if the reception quality is not subject to high requirements, damping and/or the resonance detuning can also be omitted. The damping can prevent preceding signal components from interfering with subsequent signal components through overlapping or reflections. Interference can be prevented if signals that have already been sent are dampened so that they do not interfere with other signals.

The coupling circuit 202' has the switch S1, the resistor R1 and the signal generator 201'. The coupling circuit 202' couples directly into the resonant circuit L2, C2.1, C2.2, C4. By means of the coupling circuit 202', the positioning signal 206b can be coupled into the main coil L2 or the vehicle transmitting/receiving coil L2 into the signal transmission channel 106b' and transmitted to a GPM (not shown in FIG. 2). The coupling can take place in that the resonance frequency of the resonant circuit device 200 is changed. The capacitor C4 is used to change the resonance frequency, with the aid of which the resonant circuit quality of the resonant circuit device 200 is changed and the resonant circuit device 200 is thus detuned. Detuning takes place by opening switch S1, which substantially activates the resistor R1 as a damping element.

The traction circuit 110 of the vehicle is connected to the connection 110 and is not shown in FIG. 2. The HVDC voltage is applied to the traction circuit 110 or intermediate circuit 110. This HVDC voltage is defined by the vehicle battery and its contactor. A fuse can also be provided in the vehicle. The vehicle can decide to disconnect the HV battery. In the event that the vehicle disconnected or separated the HV battery from the HVDC connection 110, no positioning signal can be generated by means of the resonant circuit device 200, and the ICS system is not able to position with the GPM 101 and CPM 102. When the switch S1 is open, the coupling circuit 202' is not bridged and is therefore not effective. If the voltage HV DC of the intermediate circuit 110 or of the traction circuit is present at the output of the rectifier 203 at the same time, an influence of the rectifier 203 and/or the influence of other components on the traction circuit 110 on the resonance frequency and/or damping of the main resonant circuit L2, C2.1, C2.2, C4 and R1 can be neglected. Subsequently, the resonance frequency and quality of the main resonant circuit L2, C2.1, C2.2, C4 and R1 are specifically adapted for the positioning with the capacitor C4. The capacitance C4 is a necessary element in the design of the energy path 107, 107a, 107b and for the energy transmission. Energy transmission systems without C4 are conceivable, but in the design according to FIGS. 1-3, C4 provides for the special use of energy transmission. Thus, C4 is provided by the design of the energy transmission portion of the system according to FIG. 1, independently of the positioning system 201', 202'. In other words, this may mean that even without the provision of the positioning functionality, the C4 capacitance would be at this point in order to allow the energy transmission. Furthermore, C4 reduces the EMC of the energy transmission. In particular, the resonance frequency and quality of the main resonant circuit L2, C2.1, C2.2, C4 and R1 are adapted to the frequency and requirements of the signal provided by the signal generator 201', for example, a keyless entry signal. The capacitance of the tuning capacitor C4 is dimensioned in such a way that the resonant circuit device 200 has a predeterminable resonance frequency $f_{r,sig}$ which corresponds to the transmission frequency of the positioning signal 206b, at about 125 kHz.

The rectifier 203 is formed from a parallel connection of two diodes connected in series. The diodes are arranged in such a way that the diodes connected in series each form a branch of the parallel connection. In a respective series connection point 108A, 108B, the anode of one diode is connected to the cathode of the other diode involved in the series connection. The parallel branches are connected to one another in a respective parallel connection point 109A, 109B. Two anodes are connected to one another in the first parallel connection point 109A and two cathodes of the diodes are connected to one another in the second parallel connection point 109B. The main resonant circuit L2, C2.1, C2.2, C4 is connected to the series connection points 108A, 108B, so that the rectifier 203 is parallel to the capacitor C4 and S1. The HVDC circuit 110 is connected to the parallel connection points 109A, 109B, so that the rectifier 203 is parallel to the output of the HVDC circuit 110.

If the voltage HVDC is applied to the rectifier during the coupling, i.e., if the switch S1 is open, it can be prevented that the rectifier 203 and/or further components on the traction circuit 110 influence the resonance frequency $f_{r,sig}$ and the damping of the resonant circuit. If the voltage HVDC is applied and is greater than the positioning signal 206b generated by the signal generator 201', a flow of energy through the bridge rectifier 203 into the HV battery can be prevented.

The frequency that is used for the positioning signal 206b is predetermined, for example, by the keyless entry technology and can be used at $f_{r,sig}$=125 kHz or $f_{r,sig}$=135 kHz.

The capacitances of the capacitors C2.1, C2.2 and the secondary coil L2 are predetermined by the energy transmission and ensure a resonance frequency $f_{r,en}$ or operating frequency of $f_{r,en}$=85 kHz when the switch S1 is closed. The capacitance of the tuning capacitor C4 is chosen so that the resonance frequency of the energy transmission $f_{r,en}$=85 kHz is adjusted with respect to the resonance frequency for positioning $f_{r,sig}$=125 kHz by opening the switch S1.

The frequency for energy transmission $f_{r,en}$ also determines the frequency for the alternating magnetic field and can be selected from the range from 25 kHz to 150 kHz or from the range of [25 kHz; 150 kHz]. This frequency range can also be specified by international guidelines.

In contrast to the fact that the resonance frequency is related to the positioning signal during the transmission of the positioning signal, the size of the coupling capacitors C2.1, C2.2 and the inductance of the transmitting/receiving coil L2 is specified by the energy transmission with an operating frequency of 85 kHz. The capacitance of the tuning capacitor C4 is chosen so that the resonant circuit frequencies for the transmission of the positioning signal and the energy transmission are matched to one another.

The control unit (not shown in FIG. 1) is designed in such a way that it can distinguish between two states. The first state is the positioning state, which is active when the CPM and GPM are mutually aligned. In this state, the control unit must ensure that no energy transmission occurs and that the switch S1 is open. The channel 106b' can thus be used exclusively for the transmission of the positioning signal. The second state is the energy transmission state, or the fuel filling state. In this state, the control unit must ensure that no transmission of the positioning signal takes place and that the switch S1 is closed. The channel 107b' can thus be used exclusively for the energy transmission. Closing the switch S1 protects the coupling circuit 202' from the transmitted energy.

During the positioning process in the positioning state, the switch S1 is opened. After opening the switch S1, a smaller substitute resonance capacitor $C_P$ is connected to the resonant circuit L2, C2.1, C2.2, C4 and in particular to the coil L2 which can be calculated from the series connection of capacitors C2.1, C2.2, C4, in particular the series connection of their capacitances C2.1, C2.2, C4, as follows:

$$C_P = \frac{1}{\frac{1}{2.1} + \frac{1}{2.2} + \frac{1}{C_4}}.$$

During the energy transmission, the resonance frequency is determined by the fact that the energy flow received via L2 is conducted into the traction circuit 110 with the HVDC voltage. Because the energy received in L2 is introduced into the traction circuit 110, the resonance frequency is dependent on the HVDC voltage and charging power. A different equivalent circuit is therefore formed, which is additionally non-linear, since C4 clamping is forced by the rectifier 203, through which the capacitance C4 remains at a fixed voltage that is specified by the traction circuit 110.

The capacitance of the capacitor C4 can be selected so that in this positioning state there is a capacitance of the equivalent resonance capacitor $C_P$ so that it results in the desired resonance frequency $f_{r,sig}$ for the positioning signal. The resonance frequency in the positioning state results from the formula:

$$f_{r,sig} = \frac{1}{2 \times \pi \times \sqrt{L_2 \times C_P}}.$$

In the example with $f_{r,sig}$=125 kHz, C4 is chosen to be 21 nF. The remaining components are chosen as C2.1=C2.2=62 nF and L2=129 uH.

In order to dimension the CPM 102, the inductance of the secondary coil L2 is first specified, which results from the mechanical structure, for example, the size of the CPM 102. On the basis of a further complex analysis, C2.1, C2.2 are defined by the desired energy transmission. Subsequently, C4 is optimized for positioning so that it results in the desired resonance frequency $f_{r,sig}$.

With the direct coupling shown in FIG. 2, the desired quality of the resonant circuit can be adjusted by selecting the damping resistor R1 and thus a transmission of information in the positioning signal can be made possible. The damping resistor R1 is given by the following formula:

$$R1 = \frac{1}{Q} \cdot \sqrt{\frac{L}{C}}.$$

In one example, R1 results in 3.3Ω. The quality Q can be selected from a range of values from 8 to 16. The value for the quality can be specified by the signal generator 201, for example, by requesting a positioning module. If C4 meets the requirements for energy transmission and positioning, a complex impedance Z1 can also be installed at point R1.

By closing the switch S1, the energy transmission state is switched back to after the positioning process and the energy transmission is made possible.

FIG. 3 shows a resonant circuit device 200" of a CPM 102" with a galvanically separated coupling circuit 202" according to one embodiment of the present invention. In comparison with the circuit 200 shown in FIG. 1, the coupling circuit 202" has the galvanically separated interface T1 via which the positioning signal 206b" from the signal generator 201 is coupled into the resonant circuit. The galvanically separated interface T1 is formed by a transformer T1. The signal generator 201, which generates the positioning signal, is connected to the primary coil of the transformer T1 via a resistor R2.

The galvanically separated coupling circuit thus has the resistors R1 and R2 and in the positioning state the sum of the damping resistors R1 and R2 must be taken into account to calculate the quality of the main resonant circuit.

In the energy transmission state, the coupling circuit 202" is bridged by means of the closed switch S1, and the resulting resonance frequency $f_{r,en}$ corresponds to the resonance frequency of the resonant circuit device 200 with the directly coupled coupling circuit 202.

If no stray field transformer is used as transformer T1, it can substantially be ensured that its inductances do not affect the signal and influence the resonance frequency and/or quality. Galvanic separation with transformer T1 is to be provided when the signal generator 201' is at LV (low voltage) potential, for example, when the signal generator 201' is operated by the 12 V voltage of the vehicle battery. Designs are conceivable in which the signal generator is installed on the HV side in the traction circuit 110 and no galvanic separation is necessary.

Figure 4:
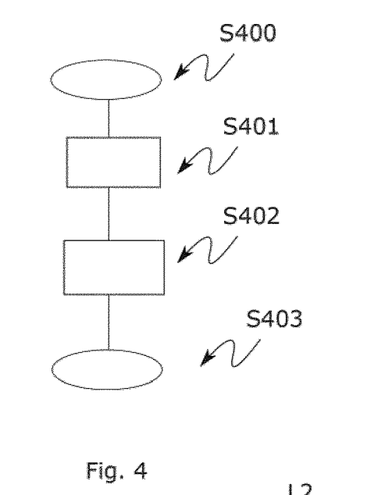
FIG. 4 shows a flow diagram for a method of operating the resonant circuit device according to one embodiment of the present invention.

FIG. 4 is a flow diagram for a method of operating the resonant circuit device 200, 200" according to one embodiment of the present invention. The method begins in an initial state S400. In the state S401, it is ensured that the signal generator 201 is activated by means of the switching device S1 by opening the switch S1. Due to the detuning of the resonant circuit 200, 200" achieved in this way, the open switch S1 prevents energy transmission while the signal generator 201 is active. If it is ensured that the switch is open, operating the signal generator takes place in the state S402. The method is ended in the state S403.

Figure 5:
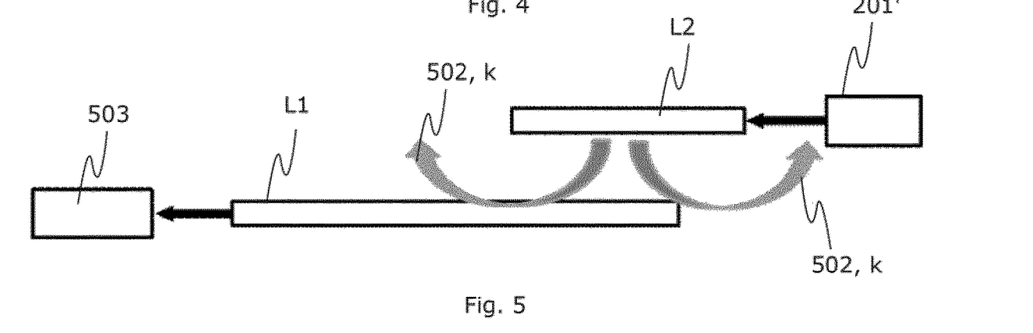
FIG. 5 shows a schematic block diagram for coupling a positioning signal into a main coil L1 according to one embodiment of the present invention.

FIG. 5 is a schematic block diagram for coupling a positioning signal into a main coil L1 according to one embodiment of the present invention. During the positioning or alignment of the CPM 102 with respect to the GPM 110, the secondary coil L2 and the primary coil L1 or main coil L1 move relative to one another. The positioning signal 502 is emitted by the secondary coil L2 and penetrates the primary coil L1 as a function of the coupling factor k, for example, via the logical positioning channel 106. When the positioning signal 502 is coupled into the main coil L1, it is sent via the same mechanical coupling or the same coil L2 via which the energy transmission takes place, and thus via the energy transmission channel 107, which coincides with the positioning channel 106. Only the direction of propagation of the energy transmission and the direction of propagation of the positioning signal 502 differ. The positioning signal 502 is coupled into the secondary coil L2 and received by L1, as well as by special additional positioning sensors which, however, are not shown in FIG. 5.

A current and/or voltage measuring device 503 is already present on the primary coil for power regulation during energy transmission. This current and/or voltage measuring device 503 within the main resonant circuit and/or filter elements present on the main resonant circuit can be operated by a control unit in such a way that they can be used not only for power measurement but also directly for determining the magnetic coupling k of the energy transmission. It is thus possible to determine the magnetic coupling k for the coils L1, L2, which are used for the energy transmission, at the same time already during the positioning with the positioning signal 502. In addition, the measurement of the voltage induced in the main coil L1 by the positioning signal 502 can also be used to determine the coordinates of the GPM to the CPM and/or to determine the distance between the GPM and the CPM if the corresponding control unit is designed for this purpose.

Figure 6:
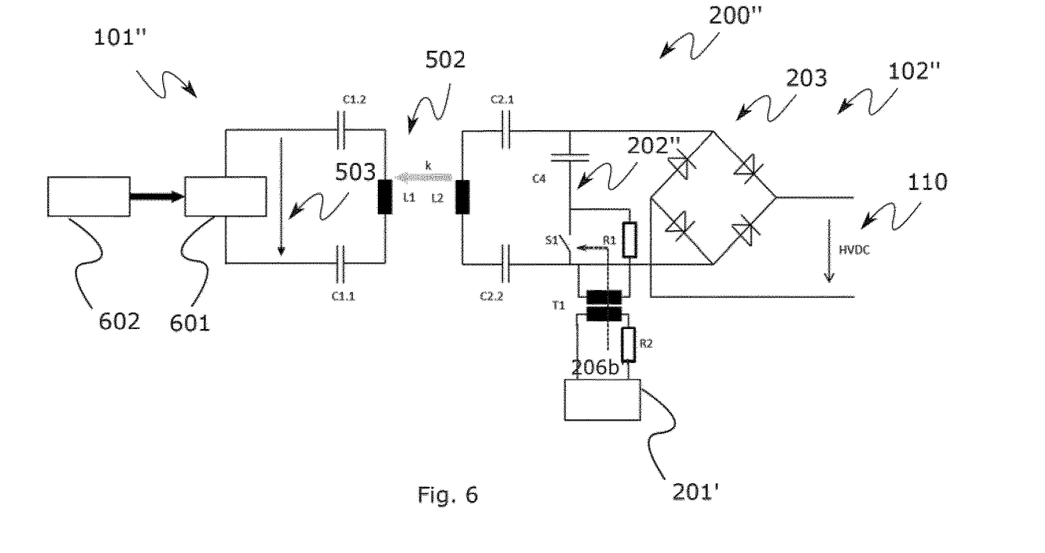
FIG. 6 shows a block diagram of a transmission link for inductive charging according to one embodiment of the present invention.

FIG. 6 is a block diagram of a transmission link for inductive charging according to one embodiment of the present invention. The CPM 102" transmits the positioning signal 502 from the secondary coil L2 to the primary coil L1 of the GPM 101". During this transmission, the CPM 102" and the GPM 101" are loosely coupled via a magnetic field with the same coupling factor k as a subsequent energy transmission. The secondary coil L2 forms, together with the capacitors C2.1, C2.2, and C4, the secondary resonant circuit, the resonance frequency of which is adapted by the capacitor C4 so that it matches the positioning signal sensors (not shown in FIG. 6), for example, 125 kHz. Even if the resonance frequency of the main resonant circuit or the primary resonant circuit, which is formed from the primary coil L1 and the capacitors C1.2 and C2.2 and is, for example, 85 kHz, deviates from the resonance frequency of the secondary resonant circuit, the positioning signal 502 excites a resonance in the primary resonant circuit. This resonance can be evaluated by means of the current and/or voltage measuring device 503 and an associated signal measurement in order to determine the coordinates of the GPM 101" to the CPM 102" and/or to determine the distance from the GPM 101" with respect to the CPM 102". The adaptation network 601 required for the energy transmission influences the resonance frequency of the primary resonant circuit, but like the driver stage 602 present for the energy transmission, it is not used for the position determination, since the energy transmission is not active during the positioning.

The additional capacitor C4 or tuning capacitor C4 is useful for the EMC (electromagnetic compatibility) reduction, since it reduces the harmonics of the energy transmission and is therefore also an element that can be used for the energy transmission. Or in other words, the tuning capacitor C4 is designed in such a way that it not only ensures that the resonance frequency is adapted to special positioning sensors (not shown in FIG. 6) during a transmission of a positioning signal 502 when the switch S1 is open, but also that it ensures an EMC reduction if it is integrated into the secondary resonant circuit during the energy transmission using switch S1.

In addition, it should be pointed out that "comprising", including", and "having" do not exclude any other elements or steps and that "a" or "an" does not exclude a plurality. It should also be noted that features or steps that have been described with reference to one of the above embodiments can also be used in combination with other features or steps of other embodiments described above. Reference signs in the claims are not to be regarded as a restriction.

The invention claimed is:

1. A resonant circuit device comprising:
a transmitting/receiving coil configured to transmit and/or receive magnetic energy;
a coupling capacitor;
a tuning capacitor; and
a switching device connected in a series connection to the coupling capacitor and the tuning capacitor, the switching device configured to:
activate a signal generator to generate a positioning signal when the switching device is opened, and detune a quality factor of the resonant circuit device to a first resonance frequency, so that the positioning signal is transmitted via the transmitting/receiving coil at the first resonance frequency, wherein the positioning signal allows a receiver to determine its distance from the transmitting/receiving coil; and
disconnect the signal generator when the switching device is closed so that the quality factor of the resonant circuit device is tuned to a second resonance frequency, wherein the magnetic energy is capable of being transmitted and/or received via the transmitting/receiving coil at the second resonance frequency, the second resonance frequency being different from the first resonance frequency.

2. The resonant circuit device according to claim 1, wherein the switching device includes a resistor to detune the quality factor.

3. The resonant circuit device according to claim 1, wherein the switching device has a galvanic separation.

4. The resonant circuit device according to claim 1, further comprising a control unit configured to ensure that the signal generator is operated only when the signal generator is activated and/or that no further energy is transmitted.

5. The resonant circuit device according to claim 1, wherein a bridge rectifier is connected in parallel to the series connection of the tuning capacitor and the switching device.

6. The resonant circuit device according to claim 5,
wherein the bridge rectifier is connected in parallel to the series connection of the tuning capacitor and the switching device at a respective series connection point of the bridge rectifier;
wherein the bridge rectifier is formed from a parallel connection of two diodes connected in a series connection, the two diodes being arranged in such a way that each of the two diodes forms a branch of the parallel connection; and
wherein at the respective series connection point an anode of one of the two diodes is connected to a cathode of another of the two diodes involved in the series connection.

7. The resonant circuit device according to claim 1, wherein capacitance of the tuning capacitor is dimensioned so that the resonant circuit device has the first resonance frequency when the switching device is open, the first resonance frequency corresponding to a transmission frequency of the positioning signal generated by the signal generator.

8. The resonant circuit device according to claim 1, wherein the resonant circuit device is designed as a car pad module and/or as a ground pad module.

9. A transformer comprising:
a primary coil; and
the resonant circuit device according to claim 1, wherein the transmitting/receiving coil of the resonant circuit device is magnetically coupled as a secondary coil to the primary coil.

10. A vehicle comprising a transformer according to claim 9.

11. A vehicle comprising a resonant circuit device according to claim 1.

12. A method of operating a resonant circuit device, the method comprising:
providing the resonant circuit device, wherein the resonant circuit device comprises a transmitting/receiving coil configured to transmit and/or receive magnetic energy, a coupling capacitor, a tuning capacitor, and a switching device connected in a series connection to the coupling capacitor and the tuning capacitor, the switching device configured to activate a signal generator to generate a positioning signal when the switching device is opened, and to detune a quality factor of the resonant circuit device to a first resonance frequency, so that the positioning signal is transmitted via the transmitting/receiving coil at the first resonance frequency, wherein the positioning signal allows a receiver to determine its distance from the transmitting/receiving coil, and the switching device further configured to disconnect the signal generator when the switching device is closed so that the quality factor of the resonant circuit device is tuned to a second resonance frequency, wherein the magnetic energy is capable of being transmitted and/or received via the transmitting/receiving coil at the second resonance frequency, the second resonance frequency being different from the first resonance frequency,
activating the signal generator via opening of the switching device; and operating the signal generator to generate the positioning signal.

\* \* \* \* \*